United States Patent [19]

Puri et al.

[11] Patent Number: 4,478,599

[45] Date of Patent: Oct. 23, 1984

[54] METHOD OF CONTINUOUSLY CONTROLLING CRYSTAL FINES FORMATION

[75] Inventors: Avinash D. Puri; James B. Rodosevich, both of Ridgecrest; James L. Fairchild, Trona, all of Calif.

[73] Assignee: Kerr-McGee Chemical Corporation, Oklahoma City, Okla.

[21] Appl. No.: 382,048

[22] Filed: May 25, 1982

[51] Int. Cl.$^3$ .................. B01D 9/02; C01D 7/24; C01D 7/40
[52] U.S. Cl. .................... 23/300; 23/302 T; 423/266; 423/422
[58] Field of Search ............. 23/300, 302 T, 313 R; 423/189, 209, 266, 422

[56] References Cited

U.S. PATENT DOCUMENTS

| | | | |
|---|---|---|---|
| 2,954,282 | 9/1960 | Bauer et al. | 23/300 |
| 3,037,849 | 6/1962 | Frint et al. | 23/300 |
| 3,072,466 | 1/1963 | Bauer et al. | 23/300 |
| 3,197,289 | 7/1965 | Rogers | 423/266 |
| 3,653,847 | 4/1972 | Ableson | 23/296 |
| 3,780,160 | 12/1973 | Waggener et al. | 423/186 |
| 3,883,640 | 5/1975 | Smart | 23/300 |
| 3,900,292 | 8/1975 | Fairchild | 23/273 R |
| 3,975,499 | 8/1976 | Walden | 423/266 |
| 3,981,686 | 9/1976 | Lobunez et al. | 23/302 T |
| 4,119,632 | 10/1978 | Newport et al. | 23/300 |
| 4,283,277 | 8/1981 | Brison et al. | 209/166 |
| 4,291,002 | 9/1981 | Arnold et al. | 423/189 |
| 4,374,102 | 2/1983 | Connelly et al. | 23/302 T |

FOREIGN PATENT DOCUMENTS

611016 11/1961 Belgium .
48-17160 5/1973 Japan .................... 423/422
208699 1/1968 U.S.S.R. .

OTHER PUBLICATIONS

Oliver, "Guide to the Use of Flocculants in Mineral Processing Plants", *Engineering and Mining Journal,* Jun. 1963, pp. 193–203.
Nemeth, "Filtration in the Mineral Industries", *Filtration Principles and Practice,* part II, pp. 20–21, (1979).
Betz Handbook of Industrial Water Conditioning, (8th ed. 1980), pp. 24–27, 338–339.
*Principles of Industrial Water Treatment,* (1st ed. 1977), p. 79.
Chemical Abstracts: vol. 63: 17246f, 1965.

*Primary Examiner*—Bradley Garris
*Attorney, Agent, or Firm*—William G. Addison

[57] ABSTRACT

A method for continuously controlling the formation of crystal fines in a continuous crystallizing process in which product crystals are produced in a crystallizing zone from crystallizable material in a mother liquor, and in which product crystals are thereafter recovered. The invention is practiced by adding a flocculant, specific to the crystallizable material, to the mother liquor at a rate effective to cause flocculation of particles of crystallizable material in the mother liquor. One embodiment of the invention is practiced in a process for producing sodium bicarbonate crystals by adding anionic polyacrylate and/or polyacrylamide polymers to a sodium carbonate-containing feed brine received in a carbonator.

6 Claims, 8 Drawing Figures

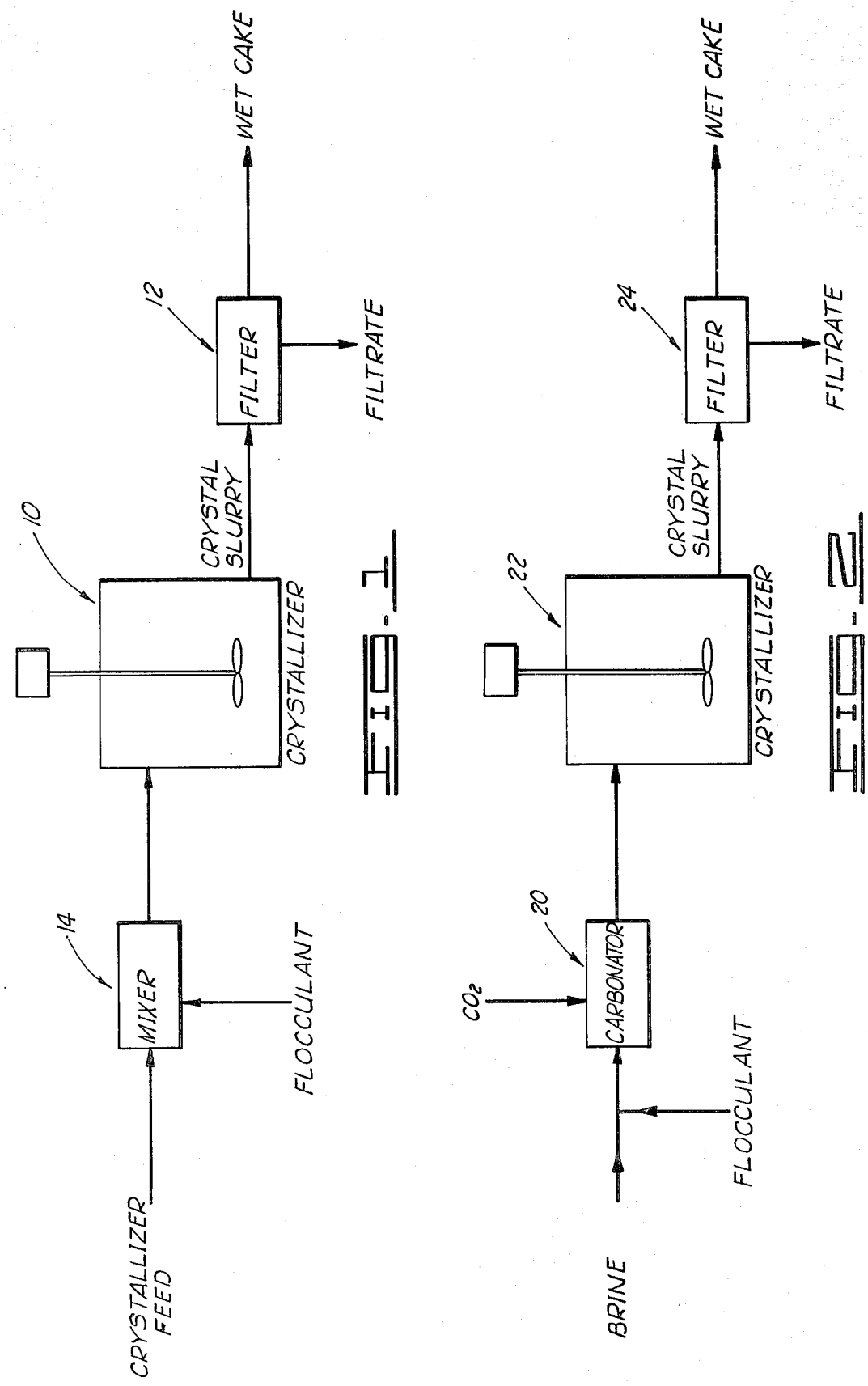

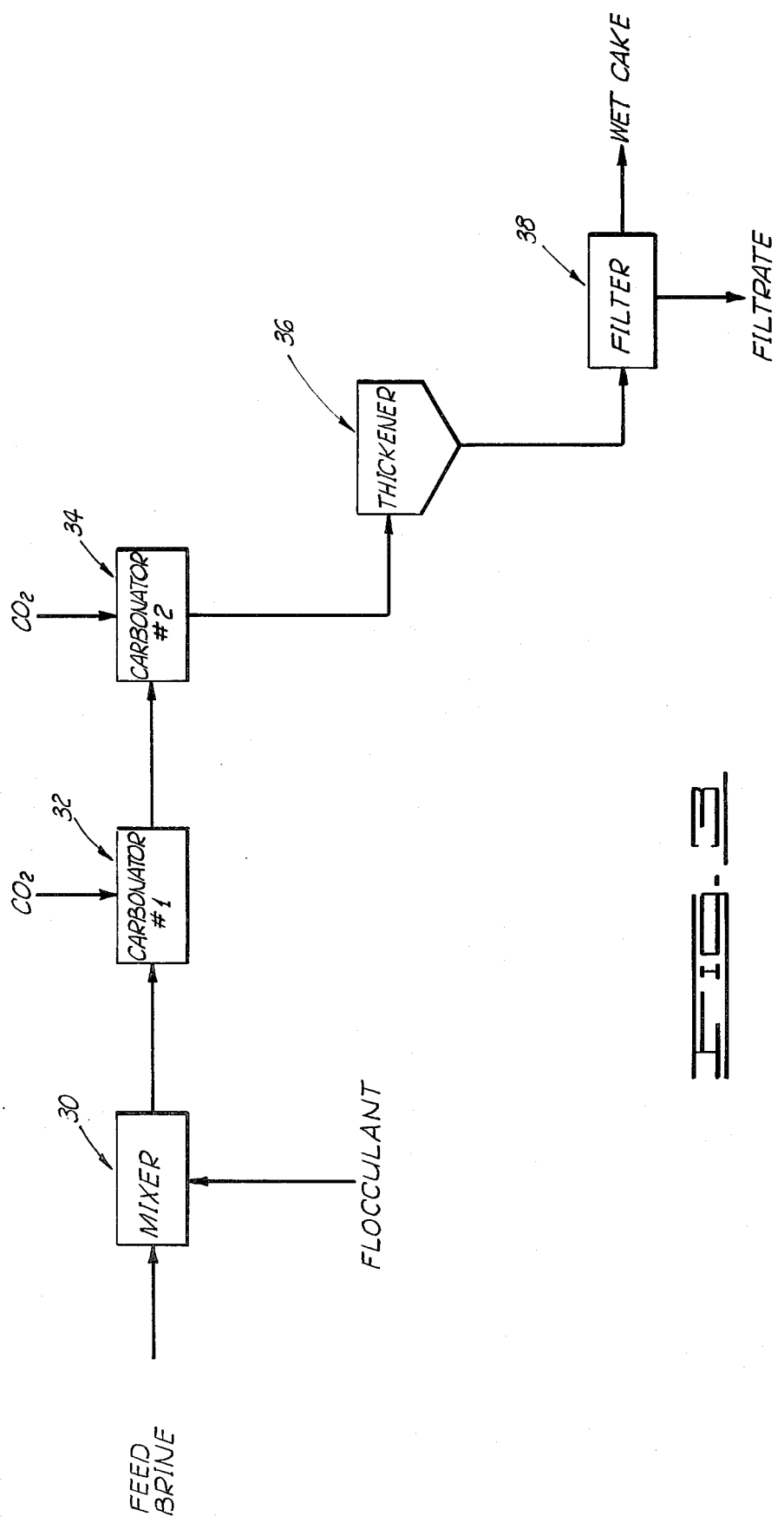

METHOD OF CONTINUOUSLY CONTROLLING CRYSTAL FINES FORMATION

FIELD OF THE INVENTION

The present invention relates generally to methods for producing crystals, and more particularly to methods for controlling the size of crystals so produced.

SUMMARY OF THE INVENTION

The present invention comprises a method of continuously controlling the formation of crystal fines in a continuous crystallizing process in which product crystals are produced in a crystallizing zone from crystallizable material in a mother liquor and in which product crystals produced in the crystallizing zone are thereafter recovered. The invention comprises adding a flocculant, specific to the crystallizable material, to the mother liquor at a rate effective to cause flocculation of particles of crystallizable material in the mother liquor.

BRIEF DESCRIPTION OF THE FIGURES

FIG. 1 is a schematic diagram of the flow of materials in one embodiment of the present invention.

FIG. 2 is a schematic diagram of the flow of materials in another embodiment of the present invention, in which a flocculant is added to feed brine in a process for crystallizing sodium bicarbonate.

FIG. 3 is a schematic diagram of the flow of materials in another embodiment of the present invention in which a flocculant is added to feed brine in a process for crystallization of sodium bicarbonate.

BRIEF DESCRIPTION OF THE PREFERRED EMBODIMENT

Figure 4:
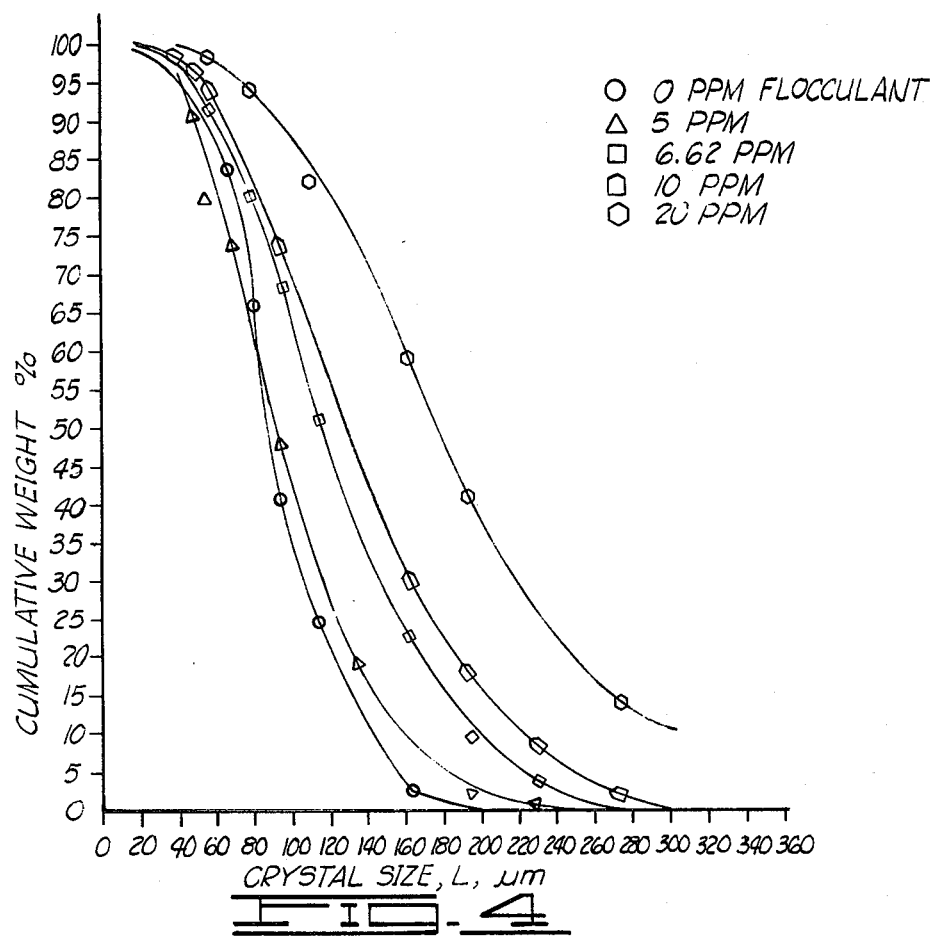
FIG. 4 shows the cummulative crystal size distribution of sodium bicarbonate crystals produced from a carbonated feed brine in accordance with the present invention at 100° F. and at several different flocculant levels.

FIG. 1 shows a conventional crystallizing process as it has been modified by the method of the present invention. A crystallizer feed, comprising a mother liquor, is continuously received in a crystallizing zone 10, which preferably comprises a crystallizer of the continuous mixed-suspension, mixed-product-removal type. Product crystals are formed in the crystallizing zone 10 from crystallizable material in the mother liquor. A slurry containing mother liquor and product crystals is continuously withdrawn from the crystallizing zone 10, and is transferred to a filtering zone 12, where a wet cake comprising product crystals is recovered and separated from a filtrate comprising mother liquor.

In order to recover product crystals of the size and purity needed for many applications, it is necessary to minimize the quantity of crystal fines formed in the crystallizing zone 10 and thereafter recovered in the filtering zone 12. In accordance with the present invention, formation of crystal fines is controlled by continuously adding a flocculant to a mixing zone 14, where the flocculant is mixed with the mother liquor. The mixture of flocculant and mother liquor is thereafter introduced into the crystallizing zone 10.

The flocculant which is added to the mother liquor must be specific to the crystallizable material—that is, the flocculant must be capable of flocculating particles of the crystallizable material. In many instances, a flocculant specific to the pertinent crystallizable material will already be known; if not, a specific flocculant may be selected from available flocculants by simple testing procedures within the ability of those skilled in the art.

In the embodiment shown in FIG. 1, the flocculant is added to the mother liquor prior to its reception in the crystallizing zone 10. Alternately, a flocculant may be added while the mother liquor is disposed in the crystallizing zone 10. The flocculant is added to the mother liquor at a rate effective to cause flocculation of particles of crystallizable material in the mother liquor.

In the embodiment shown in FIG. 1, it is contemplated that mother liquor is already supersaturated in crystallizable material when it is received in the crystallizing zone. However, it should be understood that the method of the present invention has equal applicability to other types of crystallizing systems. For example, the crystallizing zone may alternatively comprise an evaporative crystallizer, in which supersaturation conditions are achieved by evaporation of liquid from the crystallizing zone. In another embodiment, a portion of the crystal slurry which is withdrawn from the crystallizing zone may be cooled and recycled to the crystallizing zone. In yet another embodiment, the crystallizing zone may receive reaction gas (e.g. carbon dioxide) in order to convert dissolved material in the mother liquor (e.g., sodium carbonate) to crystallizable material (e.g., sodium bicarbonate) for forming product crystals. Thus, it will be understood that the method of the present invention is applicable to any type of crystallizing system in which mother liquor is received in a crystallizing zone and in which product crystals are produced from crystallizable material contained in the mother liquor in the crystallizing zone.

The mechanism of action by the flocculant in the crystallizing zone 10 is not completely understood. However, it is believed that the flocculant generally operates to agglomerate fine particles of crystallizable material into larger product crystals—thus reducing the quantity of fines. When crystal fines are produced in sufficient quantity in the crystallizing zone, as may occur when a sodium bicarbonate crystallizing process is carried out at relatively low temperatures, the agglomeration of fine particles results in the production of large, spherulitic crystals—in this situation, the flocculant acts as a sort of crystal habit modifer. Because spherulitic crystals have a low ratio of surface area to volume, they retain a low quantity of mother liquor after filtration in the filtration zone 14. The wet cake formed from such spherulitic crystals offers a high degree of product purity because of the low level of entrained mother liquor associated therewith.

When a relatively small quantity of crystal fines is produced in the crystallizing zone, as when a bicarbonate crystallization process is carried out at higher temperatures, it is believed that the concentration of such fines is not sufficiently high that the flocculant will cause agglomeration of fines into spherulitic crystals. Instead, it is believed that the fines agglomerate to produce larger sized crystals having a shape resembling that of crystals produced without the use of flocculant.

FIG. 2 illustrates the method of the present invention as applied in a multi-stage process for producing crystals of sodium bicarbonate. A feed brine (mother liquor) containing sodium carbonate is introduced into a carbonating zone 10, where carbon dioxide is reactively contacted with the feed brine to produce dissolved sodium bicarbonate and product crystals of sodium bicarbonate. The carbonating zone 10 thus acts as the first crystallizing stage of a two-stage crystallizing zone.

A crystal slurry comprising feed brine (mother liquor) containing dissolved sodium bicarbonate and sodium bicarbonate product crystals is transferred from the carbonating zone 20 to a second stage crystallizing zone 22, which preferably comprises a crystallizer of the continuous, mixed-suspension, mixed-product-removal type. The second stage crystallizing zone 22 is preferably cooled relative to the carbonating zone 20. In the second stage crystallizing zone 22, additional product crystals of sodium bicarbonate are formed. A crystal slurry comprising product crystals and mother liquor is withdrawn from the second stage crystallizing zone and is transferred to a filtration zone 24, where product crystals are separated from the slurry and recovered as wet cake, and where the mother liquor is recovered as a filtrate.

In order to minimize formation of crystal fines in the carbonation zone 20 and the second stage crystallizing zone 22, a flocculant specific to sodium bicarbonate is introduced into the feed brine before it is received in the carbonating zone 20; the flocculant is added at a rate effective to cause flocculation of bicarbonate particles in the carbonating zone. Alternately, the flocculant may be introduced into the carbonating zone 20, which comprises the first stage of the crystallizing zone in the system.

In general, when the crystallizing zone in a crystallizing process consists of a cascade of at least two crystallization stages disposed in serial relationship, the flocculant is added prior to the reception of the mother liquor in the second crystallizing stage. If flocculant were to be added to the mother liquor in the second crystallizing stage, or at some subsequent stage, then fines will have already formed to such an extent that best fines control results cannot be achieved.

FIG. 3 shows another type of sodium bicarbonate crystallization process, as modified by the present invention. A feed brine (mother liquor) containing sodium carbonate is mixed with flocculant specific to sodium bicarbonate in a mixing zone 30. The feed brine is then treated with carbon dioxide in a first carbonating zone 32, and is therefter transferred to a second carbonating zone 34, where it is treated with additional carbon dioxide. The first and second carbonating zones 32 and 34 preferably comprise carbonating towers, in which the brine flows in counterflow relationship to carbon dioxide.

Ordinarily, crystals of sodium bicarbonate form in the second carbonating zone 34, which is maintained at a lower pH than the first carbonating zone 32. In accordance with the present invention, the flocculant in the brine acts to flocculate crystal fines produced in the second carbonating zone 34. Crystal slurry containing feed brine and sodium bicarbonate crystals is withdrawn from the second carbonator and is transferred to a thickener 36, and thence to a filtration zone 38, where sodium bicarbonate wet cake is separated from filtrate.

Several known flocculants display the specificity to sodium bicarbonate required for practice of the present invention when the crystallizable material is sodium bicarbonate. One such flocculant is product 8UD-574, marketed by Nalco Chemical Company of Oak Brook, Ill. This product is polysodium acrylate in a water/oil emulsion: it is 100% anionic, has a long chain and a molecular weight of about 20,000,000. Another such flocculant is Superfloc ® 1201, manufactured by American Cyanimid Co., of Wayne, N.J. This product is anionic polyacrylamide copolymer in a water-in-oil emulsion. The structural formula of this copolymer is:

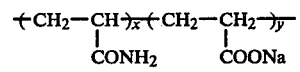

Two other flocculants specific to sodium bicarbonate are Superfloc ® 212 and Superfloc ® 214, also manufactured by American Cyanimid Co. The structural formula of these flocculants is:

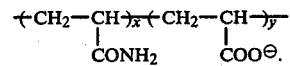

The value of x varies between 0 and 99% and the value of y is (100%−x), depending on the Superfloc ® product. Another flocculant specific to sodium biocarbonate is Betz ® polymer 1125L, marketed by Betz Laboratories, Inc. of Trevose, Pa. This product is a low charge anionic polymer.

In general, when the crystallizable material is sodium bicarbonate, the flocculant may comprise any polymer (including copolymer) having structural units selected from the group consisting of:

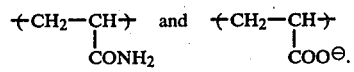

Flocculants with the greatest anionic character are preferred.

The flocculant specific to sodium bicarbonate is added to the mother liquor (feed brine) at a rate effective to cause flocculation of particles of sodium bicarbonate in the mother liquor. The rate of flocculant addition will depend on several factors, including the composition of the feed brine and the specific flocculant used. Generally, a minimum flocculant concentration in the feed brine of between about 5 p.p.m. and about 100 p.p.m. will be sufficient to flocculate particles of sodium bicarbonate in the brine solution (mother liquor); the rate of flocculant addition should be sufficient to maintain the flocculant concentration within this range.

While there appears to be no upper limit on the flocculant concentration in the feed brine required for practice of the present invention when the crystallizable material is sodium bicarbonate, economic considerations will generally dictate that the flocculant concentration, and thus the rate of flocculant addition, be maintained at a level near the minimum effective level. In some instances, high flocculant levels may interfere with carbon dioxide absorption by a flocculant treated brine solution: this factor further dictates a flocculant level near the minimum effective level.

While the method of the present invention is increasing sodium bicarbonate crystal size, and thus reducing crystal fines formation, and is not believed to be limited to a specific temperature range, and it has been determined that flocculant addition is not effective to cause production of spherulitic crystals at crystallizing zone temperatures of above about 110° F.

The following examples illustrate the practice of the method of the present invention.

EXAMPLE 1

A ten-gallon carbonator was used to carbonate 100% solar pond Upper and Lower Structure brine obtained from Searles Lake, Calif.; the brine contained approximately 5% sodium carbonate and approximately 1.8% borax by weight. The carbonator was equipped with a sparger, four baffles and a high-shear, flat-blade turbine agitator driven at 300 revolutions per minute. Separate carbonation runs were conducted at two different temperatures: at an adiabatic temperature of approximately 100° F., and at a temperature of 135° F. In all of the runs, the $CO_2$ feed rate was adjusted periodically to maintain a pH of 7.9 in the carbonator. A constant pressure of 12.97 p.s.i.g. was maintained in the carbonator during the runs.

To conduct a run, a 200 gallon feed tank was filled with a measured volume of feed brine. A 1% brine solution of the flocculant Nalco 8UD-574 was then added to the feed tank to obtain the desired flocculant concentration in the feed brine. Runs were conducted at flocculant concentrations ranging between 0 p.p.m. and 20 p.p.m. After the flocculant was added to the tank, the contents of the tank was agitated for about 20 minutes in order to obtain a complete dispersion of the flocculant in the brine. The brine was then fed to the carbonator, for a retention time of one hour.

Sampling of the crystal slurry in the carbonator was carried out by rapidly withdrawing a measured volume of sample from the carbonator discharge line, and quickly filtering it through a Buchner vacuum filter. The sodium bicarbonate solids collected on the filter were treated with one double-displacement wash with 90% methanol-10% water solution, followed by one double-displacement wash with acetone. The filter cake was dried for 3 minutes and then spread on clean wrapping paper to air dry. The size distribution of the bicarbonate crystal product was determined by screen analysis. In order to determine the effect of flocculant on crystal habit, photomicrographs were made of the recovered bicarbonate crystals. In order to determine filtration characteristics of the product crystals, filter leaf tests were carried out at the end of each run.

FIG. 4 shows the cumulative crystal size distribution for the crystal slurry withdrawn from a carbonator maintained at an adiabatic temperature of approximately 100° F., as determined at several flocculant levels. The Figure reveals that a threshold flocculant level of at least about 5 p.p.m. is required before a shift of the crystal size distribution occurs. At levels of about 5 p.p.m. or greater, flocculant addition causes a shift in the distribution to crystals of larger size.

With respect to runs carried out at 135° F., it was observed that a similar threshold concentration of at least about 5 p.p.m. flocculant was required to effect a shift in crystal size distribution.

Figure 5:
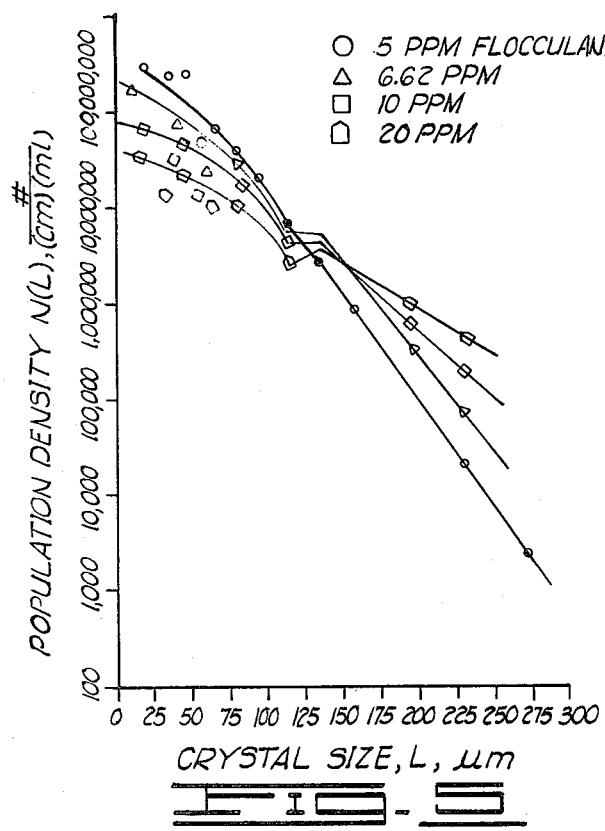
FIG. 5 shows the crystal size population density of sodium bicarbonate crystals produced from a carbonated feed brine in accordance with the present invention at 100° F. and at several different flocculant levels.

FIG. 5 shows the crystal size population density for different levels of flocculant in runs conducted at adiabatic carbonator temperatures of about 100° F. These results indicate that flocculant addition effects an increase in population of crystals having a size of more than 125 microns, and a decrease in the population of crystals having a size of less than 125 microns.

Figure 6:
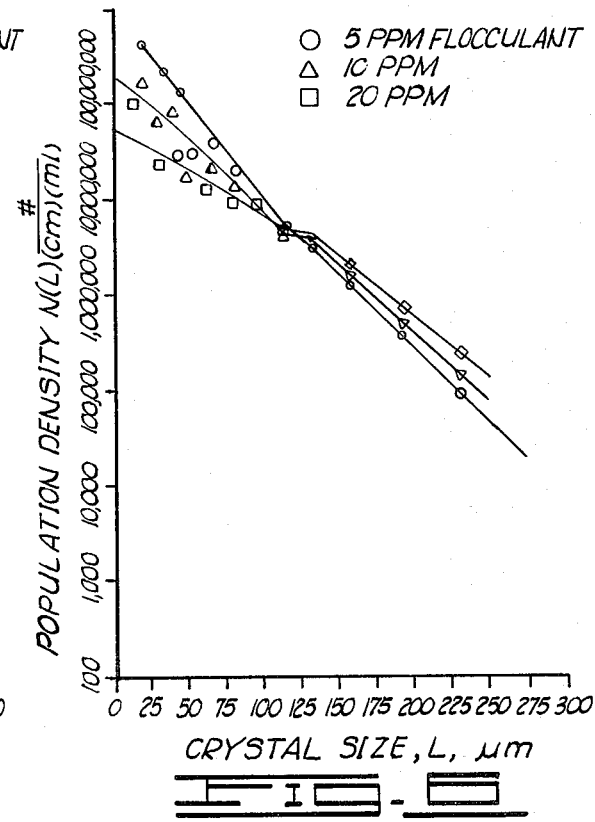
FIG. 6 shows the crystal size population density of sodium bicarbonate crystals produced from a carbonated feed brine in accordance with the present invention at 135° F. and at several different flocculant levels.

FIG. 6 shows the crystal size population density distribution for carbonator runs conducted at 135° F. The Figure shows much the same type of results obtained at adiabatic temperatures, although it will be noted that the flocculant has a lower incremental effect on crystal size at the higher temperature.

Photomicrographs were prepared for the bicarbonate crystals produced in runs carried out at different flocculant concentrations and at different carbonator temperatures. It was observed that the flocculant concentrations as low as 6.62 p.p.m. increased the number of spherulitic crystals at adiabatic temperatures. However, at temperatures of 120° F., even flocculant concentrations as great as 20 p.p.m. would not produce spherulitic crystal habit.

Filtration studies revealed that at both adiabatic temperatures and at temperatures of 135° F., increased flocculant concentration reduced the quantity of mother liquor retained in the wet cake.

Subsequent to the completion of the above-described ten-gallon carborator runs, similar runs, with the same feed brine and the same flocculant, were carried out in a plant scale multi-stage carbonator system similar to that shown in FIG. 3. Flocculant concentrations of between 0 and 16 p.p.m., and carbonator temperatures ranging between adiabatic (100° F.) and about 120° F. were employed. Results were consistent with those observed during the ten-gallon carbonator runs.

During the plant scale runs, crystals were formed in three parallel carbonators, one of which was maintained at a pH of 8.2, and the other two of which were maintained at pH of 8.5. A reduction of pH to 7.8 produced no observable effect on crystal habit when the carbonators were maintained at adiabatic temperatures of approximately 100° F. During the plant scale runs, it was further observed that, at a carbonator temperature of 120° F., spherulitic crystals were not produced even with a flocculant concentration of 8 p.p.m.

EXAMPLE 2

Carbonation runs were conducted with Upper/Lower Structure brines and Mixed Layer brines in a ten-gallon carbonator, with levels of Nalco 8UD-574 flocculant varying between 0 p.p.m. and 100 p.p.m Upper/Lower Structure brine, from Searles Lake, Calif., contains approximately 4% sodium carbonate and approximately 1.2% borax. Middle Layer brine from Searles Lake contains approximately 6.5% sodium carbonate and approximately 0.6% borax.

Experimental conditions and procedures for the runs were essentially the same as those described in Example 1, except that a carbonator retention time of approximately 50 minutes was used. All runs were carried out at adiabatic temperatures of approximately 100° F.

Figure 7:
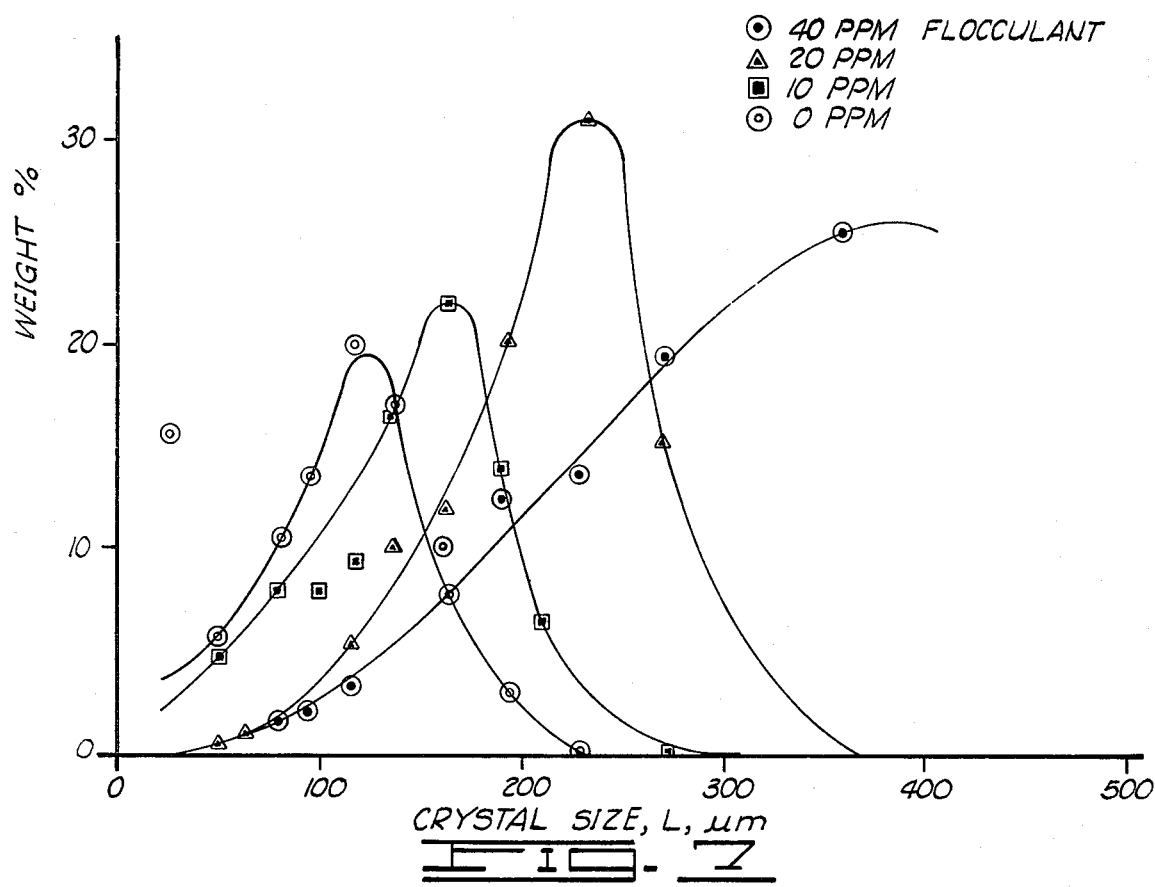
FIG. 7 shows the weight percent crystal size distribution of sodium bicarbonate crystals produced from a carbonated feed brine in accordance with the present invention at 100° F. and at several different flocculant levels.

FIG. 7 shows the weight percent versus crystal size distribution of bicarbonate crystals produced from Upper/Lower Structure brine at various flocculant concentrations. It will be noted that the highest flocculant concentration, 40 p.p.m., provides the greatest shift to large crystal size.

Figure 8:
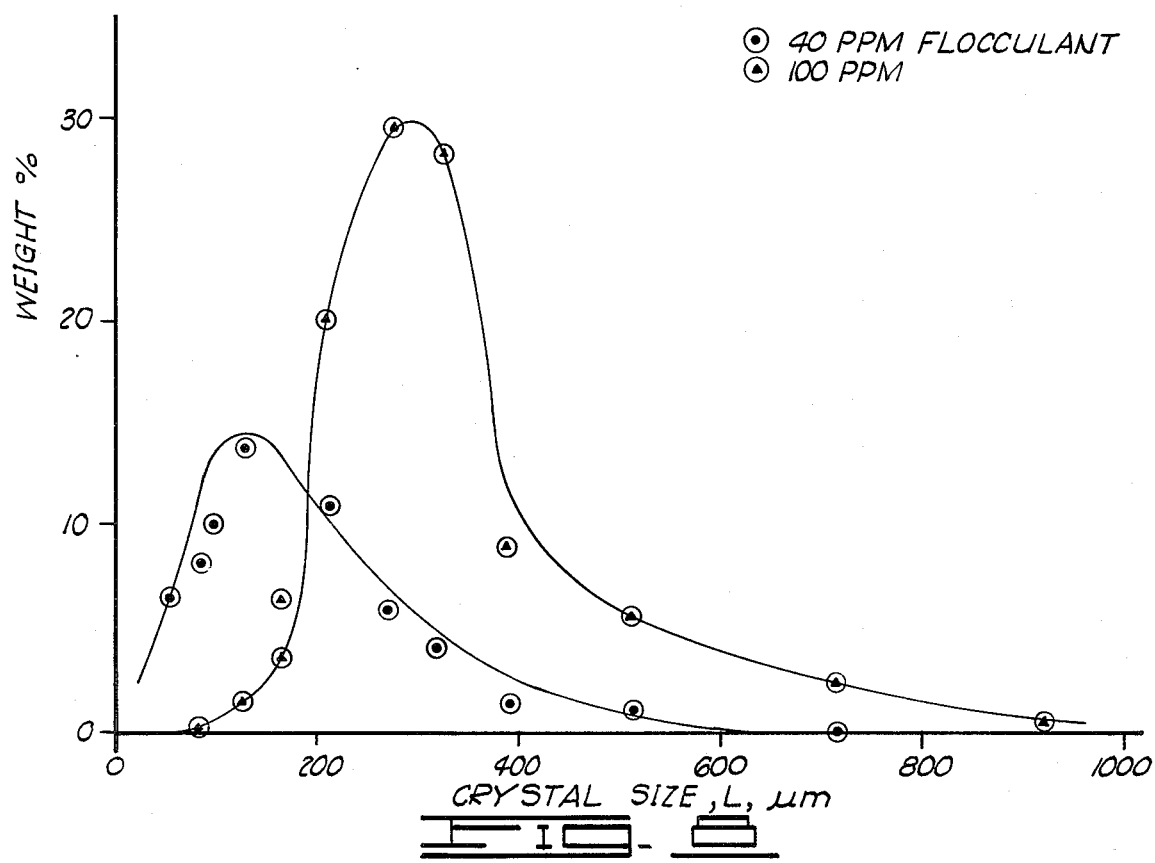
FIG. 8 shows the weight percent crystal size distribution of sodium bicarbonate crystals produced from a carbonated feed brine in accordance with the present invention at 100° F. and at two different flocculant levels.

FIG. 8 shows the weight percent versus crystal size distribution for bicarbonate crystals produced from Mixed Layer brine at various flocculant concentrations. It will be noted that the higher flocculant concentration, 100 p.p.m., provides the greatest shift to larger crystal size.

EXAMPLE 3

Several flocculants were tested for their effect on crystal size and mother liquor rentention in a lab scale carbonation and crystallization system. In this system, feed brine was received in a carbonating crystallizer, maintained at 120° F., for a retention time of 30 minutes. Crystal slurry overflowing from the carbonator overflows into a cooling crystallizer, which was maintained at 85° F. Retention time in the cooling crystallizer was likewise 30 minutes. Both crystallizers were equipped with agitators: the agitator in the carbonating crystallizer turned at 750 r.p.m., and the agitator in the cooling crystallizer turned at 448 r.p.m.

The brine used in these runs was a mixture of 60% Upper Structure brine and 40% Lower Structure brine from Searles Lake, Calif. In all but the control run, flocculant was mixed with the brine at a concentration of 100 p.p.m. The flocculant was mixed thoroughly with the feed brine before it was introduced into the carbonating crystallizer.

The flocculants used in the runs were: Superfloc ® 214, a strongly anionic polyacrylamide, Superfloc ® 212, a mildly anionic polyacrylamide, and Superfloc ® 127, a non-ionic polyacrylamide. All were manufactured by American Cyanimid Co., of Wayne, N.J.

The weight percentage of liquor entrainment and the crystal product size were determined for samples withdrawn from both the carbonating crystallizer and the cooling crystallizer. These results, which are reported in Table I, reveal that more strongly anionic flocculants produce less liquor retention and greater shift to larger crystal size.

TABLE I

| Flocculant | Carbonating Crystallizer Product Screen Analysis | | | Cooling Crystallizer Product Screen Analysis | | |
|---|---|---|---|---|---|---|
| | Wt. % Liquor Entrainment | Wt. % + 50 Mesh | Wt. % + 200 Mesh | Wt. % Liquor Entrainment | Wt. % + 50 Mesh | Wt. % + 200 Mesh |
| None | 28.13 | 2.45 | 57.18 | 26.03 | 1.43 | 61.15 |
| Superfloc ® 214 | 5.44 | 84.13 | 98.49 | 4.80 | 36.82 | 99.51 |
| Superfloc ® 212 | 6.35 | 39.69 | 98.98 | 6.31 | 12.67 | 99.00 |
| Superfloc ® 127 | 15.31 | 7.12 | 94.71 | 13.26 | 2.59 | 93.86 |

Photomicrographs were made of the bicarbonate crystals recovered with use of each flocculant. The crystals produced with Superfloc ® 214 and Superfloc ® 212 were large, individual, and somewhat rounded. The crystals produced with Superfloc ® 127 were large, less rounded and were formed from smaller particles which were held together securely.

EXAMPLE 4

The flocculant Superfloc ® 214 was tested at various concentrations in a 60% Upper Structure/40% Lower Structure brine mixture, from Searles Lake, Calif. The experimental equipment and procedure were identical to those described in Example 3. Table II summarizes the results of these tests. These results confirm the action of Superfloc ® 214 in reducing liquor entrainment and increasing crystal size at flocculant concentrations lower than 100 p.p.m.

EXAMPEL 5

Mixed Layer and Lower Structure brines from Searles Lake, Calif., were tested in a lab scale, one-liter batch carbonator, with and without the flocculant Superfloc ® 214. One liter of feed brine was placed in the carbonator and heated to 140° F., and $CO_2$ was bubbled through the mixture. When solids began to form, the temperature was lowered to 95° F., $CO_2$ flow was shut off, and the contents removed and filtered. The percentage of mother liquor entrainment was calculated, the crystal size was measured, and photomicrographs were made of the recovered bicarbonate crystals.

As noted above, runs were conducted in brine containing flocculant and brines without flocculant. When flocculant was added, it was pre-mixed with the brine and agitated for one hour before the treated brine was added to the carbonator. Flocculant concentration in the brine was 100 p.p.m.

TABLE II

| Flocculant | Concentration p.p.m. | Carbonating Crystallizer Product Screen Analysis | | | Cooling Crystallizer Product Screen Analysis | | |
|---|---|---|---|---|---|---|---|
| | | Wt. % Liquor Entrainment | Wt. % + 50 Mesh | Wt. % + 200 Mesh | Wt. % Liquor Entrainment | Wt. % + 50 Mesh | Wt. % + 200 Mesh |
| None | | 28.13 | 2.45 | 57.18 | 26.03 | 1.88 | 61.85 |
| Superfloc ® 214 | 5 | 14.98 | 1.47 | 90.32 | 15.22 | 2.27 | 90.09 |
| | 10 | 13.80 | 3.54 | 88.80 | 13.68 | 3.09 | 89.14 |
| | 20 | 11.04 | 4.65 | 97.56 | 12.24 | 5.81 | 97.54 |
| | 25 | 9.27 | 21.51 | 97.68 | 7.44 | 9.93 | 96.55 |
| | 50 | 6.76 | 50.36 | 98.95 | 9.54 | 28.00 | 98.64 |

TABLE III

| Brine | Flocculant | Filtration Time (Sec) | Wt. % Liquor Entrainment | Product Screen Analysis, U.S. Mesh (Wt. %) | | | |
|---|---|---|---|---|---|---|---|
| | | | | +100 | −100 +200 | −200 +400 | −400 |
| Mixed Layer | None | 3.5 | 56.8 | 53.0 | 28.5 | 14.4 | 4.1 |
| Mixed Layer | Superfloc ® 214 | 3.5 | 54.2 | 93.9 | 2.2 | 1.9 | 2.0 |
| | | 3 | 59.3 | 67.0 | 20.9 | 10.8 | 1.3 |
| | | 3.5 | 48.8 | 89.6 | 7.0 | 3.0 | 0.4 |
| Lower Structure | None | 4 | 51.6 | 41.7 | 50.1 | 7.2 | 0.1 |
| Lower Structure | Superfloc ® 214 | 4 | 50.2 | 74.2 | 23.0 | 2.7 | 0.1 |
| | | 3.5 | 51.0 | 83.3 | 15.6 | 1.0 | — |

Table III summarizes the results of these tests. These results show an increase of crystal size with addition of flocculant; the reduction of mother liquor retention with flocculant use is less pronounced than in the tests described in Examples 3 and 4. Photomicrographs revealed that the addition of the flocculant resulted in production of larger crystals than those recovered from untreated brine; however, the crystals formed with the flocculant treatment were irregular in shape.

EXAMPLE 6

Carbonation runs were conducted in a ten-gallon carbonator on Mixed Layer brine from Searles Lake, Calif. Experimental conditions and procedures for the runs were essentially the same as those described in Example 1. Separate runs were conducted at 80° F. carbonator temperature with each of the following flocculants: Betz ® polymer 1115L, a low charge anionic polymer, Betz ® polymer 1125L, Betz ® polymer 1165L, a cationic polymer, Superfloc ® 201, and Nalco product 8UD-574. Separate runs were conducted at 110° F. carbonator temperature with Betz ® polymer 1125L, and Nalco product 8UD-574.

Results showed that at 80° F. carbonator temperature, each flocculant produced a spherulitic crystal habit for crystal sizes greater than 140 mesh. At 110° F. carbonator temperature, none of the tested flocculants produced any change in bicarbonate crystal habit.

Separate carbonation runs were also conducted with Upper/Lower structure brines at 80° F., under identical experimental conditions with each of the following flocculants: Superfloc ® 1201 and Betz ® polymer 1125L. Spherulitic crystals were produced in all crystal size ranges in these runs.

Changes may be made in the various steps, procedures, compounds and compositions described herein without departing from the spirit and scope of the invention as defined in the following claims.

What is claimed is:

1. In a continuous process for the crystallization of sodium bicarbonate from a mother liquor containing crystallizable sodium bicarbonate in a crystallization zone in which process crystal fines of said sodium bicarbonate are formed, the improvements which comprise:
continuously converting said crystal fines formed in said crystallization zone to large spherulitic crystals by continuously adding to said mother liquor containing said crystallizable sodium bicarbonate a flocculent having structural units selected from the group consisting of

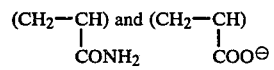

said flocculent being added to the mother liquor when the temperature of said mother liquor in said crystallization zone is about 110° F. or less and in an amount sufficient to provide for said continuous conversion of the crystal fines to large spherulitic crystals.

2. The method of claim 1 in which the flocculant comprises an anionin polymer.

3. The method of claim 2 in which the flocculant comprises an anionic polyacrylate.

4. The method of claim 3 in which the flocculant comprises polysodium acrylate.

5. The method of claim 1 in which the flocculant comprises an anionic polyacrylate-polyacrylamide copolymer.

6. The method of claim 1 in which flocculant concentration in the mother liquor is maintained at a minimum level between about 5 p.p.m. and about 100 p.p.m.

* * * * *